United States Patent [19]

Bertozzi

[11] 4,124,645

[45] Nov. 7, 1978

[54] PROCESS FOR PRODUCING HALOGEN-TERMINATED POLYSULFIDE POLYMERS

[75] Inventor: Eugene R. Bertozzi, Yardley, Pa.

[73] Assignee: Thiokol Corporation, Newtown, Pa.

[21] Appl. No.: 837,116

[22] Filed: Sep. 28, 1977

Related U.S. Application Data

[63] Continuation of Ser. No. 333,932, Feb. 20, 1973, abandoned.

[51] Int. Cl.$^2$ .............................................. C07C 149/12
[52] U.S. Cl. .................................... 260/608; 528/231; 528/404; 528/373
[58] Field of Search .............. 260/609 R, 608, 79, 260/79.1, 67 S

[56] References Cited

U.S. PATENT DOCUMENTS

| 2,484,369 | 10/1949 | Ballard et al. | 260/608 |
| 2,527,375 | 10/1950 | Fettes et al. | 260/608 |
| 2,582,605 | 1/1952 | Richter et al. | 260/608 |
| 3,258,495 | 6/1966 | Le Fave | 260/79 |

OTHER PUBLICATIONS

E. Fettes, *Chemical Reactions of Polymers*, 1964, pp. 895, 896, 905, 906.
N. Kharasch, *Organic Sulfur Compounds*, 1961, vol. 1, pp. 266–279.
E. Reid, *Organic Chemistry of Bivalent Sulfur*, Vol. II, p. 242, 1960.

*Primary Examiner*—Elbert L. Roberts
*Assistant Examiner*—Molly C. Eakin
*Attorney, Agent, or Firm*—Stanley A. Marcus; Royal E. Bright

[57] ABSTRACT

High molecular weight polysulfide polymers are produced by a novel process using polythiodiglycol, polymerizing it with an acid catalyst and with means for removing the water of reaction to make a medium molecular weight halogen-terminated polymer. The resultant halogen-terminated polymer may then be reacted with sodium polysulfide to form a latex dispersion of very high molecular weight. The dispersion may then be converted to —SH terminated polymers by the usual methods.

16 Claims, No Drawings

PROCESS FOR PRODUCING HALOGEN-TERMINATED POLYSULFIDE POLYMERS

This is a continuation of application Ser. No. 333,932 filed Feb. 20, 1973, now abandoned.

BACKGROUND OF THE INVENTION

1. Field of the Invention

This invention relates to a novel process for preparing high molecular weight polysulfide polymers from polythiodiglycol. The polythiodiglycol is polymerized with means for removing the water of reaction to a low molecular weight prepolymer provided with halogen terminals; these halogen-terminated polymers are then reactable with alkaline or alkaline earth polysulfides to form a latex dispersion of very high molecular weight. This dispersion can then be converted to —SH terminated polymers by the usual methods.

2. Description of the Prior Art

As is well known, polysulfide polymers are conventionally made by the reaction of alkaline or alkaline earth polysulfides with polyhalogenated organic compounds. Particularly used in this reaction are sodium polysulfide, $Na_2S_x$, and dichloro compounds, Cl—R—Cl, wherein $x$, the average value or rank of the polysulfide, is 2.25, and the dichloro compound is bis(2-chloro-ethyl)formal. The general reaction is:

$$nNa_2S_x + nCl—CH_2CH_2OCH_2OCH_2CH_2—Cl \rightarrow$$
$$+CH_2CH_2OCH_2OCH_2CH_2S_x+_n + 2nNaCl$$

As can be seen, the consumption of chlorine and the amount of waste sodium salts is excessive especially considering the fact that for a polymer in which $n$ is usually in the range of 2,000 to 4,000, 4,000 to 8,000 moles of sodium salts must be discarded. Also considerable quantities of a sodium polysulfide byproduct, $Na_2S_2O_3$, must be discarded as waste.

U.S. Pat. No. 2,728,748 to F. O. Davis discloses a reaction in the presence of solvents of dithiodiglycol with formaldehyde and bis — 2-chloroethyl) formal to produce polysulfide polymers. The invention of this application distinctly differs from the Davis patent wherein it is stated that to get chlorine terminals on the resultant polymer, when bis — 2-chloroethyl) formula is used, one must have the ratio of dithiodiglycol to formaldehyde less than 1.00. As will be seen by some of the examples herein, firstly, this new process may be performed in the absence of any solvents, and secondly, even if the ratio of dithiodiglycol to formaldehyde is almost 3 the novel process of this invention produces chlorine terminals on the low molecular weight polysulfide polymer although the resultant polymer will contain a slightly different backbone between the sulfur linkages. Therefore, even though there appears to be similarities in the reactions, the complete refutation of the solvent requirement and the required of Davis dictates that there must be differences such that the processes must be dissimilar. Additionally, Davis uses a dichlorinated organic material, whereas this invention uses either inorganic halogenating agents or monohalogenated organic compounds to produce the halogen terminals which will react with the alkaline or alkaline earth polysulfides.

SUMMARY OF THE INVENTION

It is an object of this invention to develop an economical process for preparing polysulfide polymers wherein the waste materials are greatly reduced in quantity.

Particularly it is an object to make polysulfide polymers from polythiodiglycol.

More particulary it is an object of make polysulfide polymers.

DESCRIPTION OF THE PREFERRED EMBODIMENTS

This process calls for making relatively low molecular weight halogen-terminated polymers of polythiodiglycols, e.g. dithiodiglycol $HOCH_2CH_2SSCH_2CH_2OH$ which may then be reacted with sufficient alkaline or alkaline earth polysulfide to form a latex dispersion of very high molecular weight. The latter can then be converted to -SH terminated polymers by the usual methods.

The polythiodiglycols useable herein have the structure $HOC_2H_4S_xC_2H_4OH$ wherein $x$ is about 2-5. Particularly useable is dithiodiglycol (DTDG), which may be made in any number of ways that are commercially known. Among these include U.S. Pat. No. 2,527,378 to the instant inventor whereby the reaction is disclosed as being:

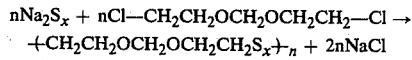 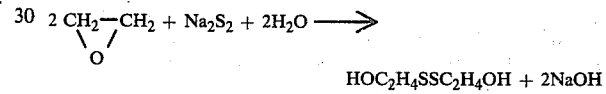

Other possible methods of manufacturing the necessary polythiodiglycols are disclosed in U.S. Pat. No. 2,754,333 and German 1,093,790 both incorporated herein by reference.

The polythiodiglycol polymers can then be made by polyetherification to an ether polymer with —OH terminals $$nHOCH_2CH_2S_xCH_2CH_2OH \rightarrow$$
$$HO—CH_2CH_2S_xCH_2CH_2O—_nH + H_2O$$

or by making the formal by copolymerizing with formaldehyde again to an —OH terminated polymer

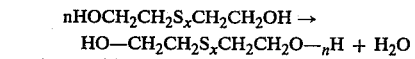
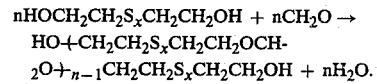

In both cases an acid catalyst with about pH 4 or less is used, as well as some means of removing the water of reaction as described below until the desired polymer molecular weight is achieved.

Either during or after the above polymerization or copolymerization, a further step must be taken to replace the terminal —OH groups with halogen atoms or monohalogenated organic compounds. For example, HCl, HBr, HI, or HF can be added in sufficient quantity during the reaction to both catalyze the reaction and to control the molecular weight of the polymer by displacing the terminal —OH with the halogen atom. Another method is to react the polymer with compounds such as thionyl chloride ($SOCl_2$), $SOI_2$, $SOF_2$, $SOBr_2$, $PO_2Cl_2$, $PCl_3$ or $PCl_5$ to produce a classical hydroxyl group displacement reaction whereby a halogen is substituted. A third method is to add a monohalogenated organic compounds to cap the terminal —OH groups and produce halogen terminals. Examples of monohalogenated organic compounds include monohalogenated epoxides such as the epihalohydrins-epichlorohydrin, epibromohydrin, epiiodohydrin, and epifluorohydrin-and monohalogenated alcohols such as ClCH$_2$CH$_2$OH (ethylene chlorohydrin), ClCH$_2$CH$_2$OCH$_2$CH$_2$OH, ClCH$_2$CH$_2$OCH$_2$CH$_2$OCH$_2$CH$_2$OH,

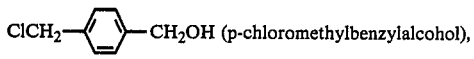 (p-chloromethylbenzylalcohol),

ClCH$_2$CH$_2$CH$_2$OH, BrCH$_2$CH$_2$OH (ethylene bromohydrin), ICH$_2$CH$_2$OH (ethylene iodohydrin), and FCH$_2$CH$_2$OH (ethylene fluorohydrin). When an epihalohydrin is added the polymer has halohydroxypropyl terminals.

The preferred method, which was found particularly effective, is to introduce a calculated amount of a halohydrin, e.g. ethylene halohydrin XCH$_2$CH$_2$OH, so that a haloethyl group or a haloethyl formal group is put in place of the terminal —OH groups. The halohydrin can be introduced at any stage of the polythiodiglycol polyether polymer or polyformal copolymer formation. The advantage of using the ethylene halohydrin termination on the polyformal polymers is that in the subsequent Na$_2$S$_x$ polymerization to very high molecular weight, a commercially useful polymer is obtained. These are the polysulfide polymers which have heretofore shown the greatest utility. In contrast, the methods stated above for direct replacement of the —OH groups with halogen atoms or with an epihalohydrin would produce, when further polymerized with Na$_2$S$_x$, products which are in effect similar to other copolymers of such as ethylene dichloride and dichloroethyl formal.

To achieve crosslinking, the original halogen-terminated polythiodiglycol polyether or polyformal can be made in the presence of a small controlled quantity, i.e. 0.5–4%, of a polyol like glycerine, pentaerythritol, or trimethylol propane. Another way to obtain the crosslinking is to add a controlled quantity of a haloorganic having three or more halogen groups, such as 1,2,3-trichloropropane, to the subsequent Na$_2$S$_x$ polymerization.

The process of this invention for the polymerization or copolymerization of the polythiodiglycol, and the halogen-termination of the resultant polymer, is carried out in the presence of an acid catalyst, at a temperature of about 50–130° C., and with means for removing the water or reaction.

The acid catalyst may be any well known acid catalyst such as, but in no way limited to, the following illustrative catalysts: hydrobromic acid, hydrochloric acid, sulfuric acid, phosphoric acid, p-toluene sulfonic acid, sulfamic acid, and ferric chloride. Acid is referred to in the Lewis sense.

The temperature is not critical and is conveniently in the range of 60° to 140° C., preferably 70° to 120° C. When a solvent is used, the temperature is conveniently about the reflux temperature of that solvent, but this may be varied.

The means for removing the water of reaction may be any means such as, but not limited to: (a) refluxing in the presence of a water immiscible solvent to azeotrope off the water of reaction, usually in reflux apparatus provided with a trap which separates the water solvent mixture, returns the solvent automatically to the reaction mixture, and enables the water to be thus separated; and (b) vacuum distillation without any solvent. In all cases the reaction is continued until the water of reaction ceases to be evolved. Typical solvents which may be employed for the purpose indicated in (a) include toluene, benzene, hexane, n-heptane, xylene, cyclohexane, carbon tetrachloride, ethylene dichloride, and propylene dichloride.

In (b) a particular advantage occurs since the vacuum distillation may be performed without the necessity of a solvent, thereby avoiding its removal at a later time in the manufacture of the desired polymers. The vacuum distillation may be performed at about the same temperature as the refluxing solvent, i.e. about 60–140° C., though preferably 80°–130° C. Another advantage in the use of vacuum distillation is a reduction in the total reaction time to produce an equivalent polymer, from 25–30 hours to 10–15 hours with the vacuum.

The following examples are intended to be merely illustrative of the invention and not in limitation thereof.

EXAMPLE 1

This example shows the making of the polythiodiglycol polymer of this invention.

1.0 mole (154 grams) of dithiodiglycol, 100 grams of benzene and 0.063 moles (12.0 grams) of p-toluene sulfonic acid are charged to the reactor and heated to reflux. The reactor is equipped with a Barrett trap to remove the water of reaction. After 7 ½ hours of refluxing, pot temperature 81–92° C., 9.0 ml. of water have been collected and another 3.0 g. of p-toluene sulfonic acid is added. The dehydration is continued for a total of 22 ½ hours at a pot temperature of 81–85° C., and a total of 16.0 ml. of water is removed which represents about 80% completion. At this point, 0.2 moles (16.1g.) of ethylene chlorohydrin are added and refluxing continues for another 7 hours at a pot temperature of 85–92° C. 6.5 ml. of water is collected during this step making a total of 22.5 ml. The bath is then filtered using a Buchner funnel and vacuum ($\approx$15 mm Hg.). 8.4 grams of catalyst are collected (not completely dry). The batch is then neutralized with NH$_3$ and again filtered. Another 4.4 grams of solids are collected. The benzene solvent is removed in a Rotovac at 85° C. and $\approx$5 mm Hg. 148.9 grams of product are obtained. A small portion of the final product is filtered again for chemical analyses which would yield: % S = 38.71; % OH = 0.27; % Cl = 3.78.

EXAMPLES 2–5

These Examples follow the procedure of Example 1, only varying the amount of ethylene chlorohydrin added to the reaction, as well as the catalyst. The results are summarized in Table I.

TABLE I
SUMMARY OF RESULTS OF EXAMPLES 2–5

| | Mole Ratio | | Catalyst | | | | |
|---|---|---|---|---|---|---|---|
| Example | Dithio-diglycol | Ethylene Chloro-hydrin | p-Toluene Sulfonic Acid | Phosphoric Acid | Reaction Temp., ° C. | % Yield | % Cl |
| 2 | 1.0 | 0.5 | — | 67.5 ml | 75–86 | 96 | 1.10 |
| 3 | 1.0 | .1 | 12.0 g | — | 73–84 | 97 | 2.19 |

TABLE I-continued
SUMMARY OF RESULTS OF EXAMPLES 2-5

| Example | Mole Ratio | | Catalyst | | Reaction Temp., °C. | % Yield | % Cl |
| --- | --- | --- | --- | --- | --- | --- | --- |
| | Dithiodiglycol | Ethylene Chlorohydrin | p-Toluene Sulfonic Acid | Phosphoric Acid | | | |
| 4[(1)] | 1.0 | .2 | 12.0 g | — | 76–87 | 94 | 3.82 |
| 5 | 1.0 | .2 | 4.0 g | 9 ml | 74–86 | 96 | 3.96 |

[(1)] Cyclohexane used as solvent-benzene used in the other Examples.

EXAMPLE 6

This Example shows the conversion from hydroxyl to chlorine terminals by means of a hydroxyl displacement reaction as opposed to using the halohydrin.

A mixture of 154 grams of dithiodiglycol, 50 ml. benzene, and 12 g. p-toluene sulfonic acid monohydrate is refluxed to remove the water of reaction until 18 mls. of water is collected in a Barrett trap. After cooling the product is filtered free of undissolved catalyst, and made slightly alkaline with gaseous ammonia. It is then distilled free of benzene to yield a product of molecular weight about 2000 and analyses as 1.7% —OH.

The liquid dithiodiglycol polymer so produced is then treated with thionyl bromide, $SOBr_2$, to replace the —OH groups with Br groups as follows: 125 g. of the dithiodiglycol polymer are diluted with 50 g. benzene and 25 g. pyridine. The solution is heated to 80° C. with stirring. To it is added 10 g. of thionyl bromide gradually over 60 minutes. The reaction mixture is kept at 80–85° C. during this period and for an additional two hours. Thereupon the reaction mixture is cooled and washed twice by shaking with 125 mls. of water in a separatory funnel. The product, still dissolved in benzene, is separated and heated in a distillation column to remove the benzene, applying gradually increasing vacuum and temperature up to a product temperature of 105° C. to 10 mm Hg. absolute. The product analyses follow:

38.7%: Sulfur
0.15%: OH
3.51%: Chlorine

EXAMPLE 7

The purpose of this example is to make the low molecular weight polysulfide copolymer of this invention from a polythiodiglycol, such as dithiodiglycol, and formaldehyde. The procedure is as follows.

In a three liter flask was added 5 mols dithiodiglycol, 770 g; 6 mols 95% paraformaldehyde, 190.5 g; 45 ml of 85% phosphoric acid catalyst; and 500 g benzene to form an azeotropic mixture with the water of reaction. The reaction was refluxed for 3 ½ hours at 86° C. to remove 125 ml. of water layer in the attached Barrett trap. Now 80.5 g (1 mol) of ethylene chlorohydrin plus 16 g. additional paraformaldehyde was added and 20 g. of p-toluene sulfonic acid catalyst. Continued reflux for eight additional hours to obtain a total 150 ml. of water layer containing some excess paraformaldehyde that had volatilized into the Barrett water trap. The batch was filtered to remove precipated phosphoric and p-toluene sulfonic acid catalysts. The slightly viscous benzene solution of product was treated with a small amount of $NH_3$ gas to a pH of about 8 to 9. The benzene was removed under vacuum on a hot water bath. The actual yield was 843 g., compared to a theoretical of 916 g. (based on rank 2.00 and 886 g. based on rank 1.85). The product was a viscous liquid, light brown polymer.

The theoretical chlorine content is 3.88%, actually obtained was 3.96%. The —OH content was 0.42%.

EXAMPLE 8

The polymer of Example 7 was polymerized with $Na_2S_{2.22}$ to form a high molecular weight polysulfide dispersion which was then "split" to form a liquid polysulfide as follows.

To a four liter stainless steel baffled reactor with a turbine agitator was added 0.75 mols, 351 ml. of 2.14 molar, $Na_2S_{2.22}$ aqueous solution. After turning on $N_2$ gas to displace air, 700 ml. of water was added. To this 2.8 g. of NaSH, 70% flake, was added to neutralize the small NaOH content of the above sodium polysulfide; also added were 28 ml. of 0.5% Nekal BX (a sodium sulfonate wetting and emulsifying agent) and 0.44 mols (35.2 g) of 50% NaOH plus 0.22 moles $MgCl_2$ (179 g. of 25% aqueous $MgCl_2.6H_2O$). The stirred polysulfide mixture was heated to 85° C. and 400 g. of the chloroethyl formal terminated polymer of Example 7 was added from a dropping funnel gradually over a period of 105 minutes at 85° C. During the feed a latex-like dispersion formed. At the end of the feed, the reaction was kept at 85° C. for 60 minutes.

The resulting "latex" was then transferred to a 6-liter stainless steel beaker and washed with warm water by settling and decantation which was repeated 7 times until free of sulfides by chemical test. The yield of latex was 325 g. on a dry basis. The latex had a roughly uniform size of about 20–30 microns (spherical particles) under microscopic examination. After standing settled for four days, there was no evidence of coagulation or lumping. A small quantity was coagulated by acidification with acetic acid to give a snappy elastomeric product. A small cake of the latex, about 1 inch in diameter and ⅜ inches thick, was made by filtering the latex on a Buchner funnel. The cake was dried at 70° C. for 24 hours in an oven. The latex solidified into a solid piece of rubber with a Shore A durometer hardness of 45, indicating a very high molecular weight elastomer.

The latex was transferred back to the stainless steel reactor and heated to 82° C. To it was added 52 ½ g. $Na_2SO_3$ plus 28 g. of 70% NaSH flakes. It was kept at 82° C. for 60 minutes. Then 120 g. of $NaHSO_3$ coagulating acid was added to a pH of 6. The wet coagulated liquid polymer was washed with hot water until clean by chemical tests. The viscous liquid polymer was dried under vacuum on a rotary drier in a hot water bath to yield 307 g. of a dry, light brown polymer with a viscosity of about 300 poise. A sample of it was mixed with 12 parts per hundred of a 50% $PbO_2$ curing paste. The mixture solidified to a solid, tough elastomer in about 10 minutes. Four hours later, its hardness was 30 Shore A. The infrared spectrum of the liquid polymer was indistinguishable from that of LP-2 as produced by the Thiokol Corporation.

EXAMPLES 9-15

The procedure of Example 7 was run with varying ratios of paraformaldehyde to dithiodiglycol as well as varying the amount and type of catalyst. The results were as shown in Table II.

TABLE II
SUMMARY OF EXAMPLES 9-15

| Example | Mole Ratio | | | Catalyst | |
|---|---|---|---|---|---|
| | Dithio-diglycol | p-Formaldehyde | Ethylene Chlorohydrin | p-Toluene-Sulfonic Acid | Phosphoric Acid |
| 9 | 1.0 | 1.41 | 0.2 | 9.0 g | — |
| 10 | 1.0 | 1.41 | 0.2 | 9.0 g | — |
| 11 | 1.0 | 1.1 | 0.2 | 12.0 g | — |
| 12 | 1.0 | 1.1 | 0.2 | 12.0 g | — |
| 13 | 1.0 | 1.21 | 0.2 | — | 9.0 ml |
| 14 | 1.0 | 1.21 | 0.2(1) | — | 9.0 ml |
| 15 | 1.0 | 1.21 | 0.2(1) | — | 9.0 ml |

| Example | Batch Yield | Polymer Treatment | Acid No. | % OH | % Cl |
|---|---|---|---|---|---|
| 9 | 95% | Filtered & Dried | 4.97 | 0.30 | 3.03 |
| 10 | 95% | Washed-Dried-Filtered | 0.29 | 0.33 | 3.42 |
| 11 | 98% | Filtered Dried | 6.84 | 0.40 | 3.14 |
| 12 | 98% | Washed-Dried-Filtered | 0.07 | 0.38 | 3.08 |
| 13 | 94% | Filtered-Dried | 1.40 | 1.17 | 3.56 |
| 14 | 94% | Washed-Dried-Filtered | 0.09 | 0.93 | 3.53 |
| 15 | 92% | Neutralized with NH$_3$ Dried & Filtered | 1.72 | 1.22 | 3.77 |

Theoretical % Cl 3.88
(1)Chlorohydrin charged along with the other reactants at the start of the reaction. In all of the other experiments, the chlorohydrin was added after 90-95% of the H$_2$O of reaction had been collected in the Barrett trap.
Note:
Benzene (100 g/mol dithiodiglycol) was used to form an azeotropic mixture with the water of reaction.

EXAMPLES 16-19

The procedure of Example 7 was repeated in these examples, except that the mole ratio of ethylene chlorohydrin to dithiodiglycol was varied, thereby varying the molecular weight of the resultant chlorine-terminated polymer. The results were as summarized in Table III.

TABLE III
SUMMARY OF RESULTS OF EXAMPLES 16-19

| Ex. | Mole Ratio | | | Catalyst | | Reaction Temp. °C. |
|---|---|---|---|---|---|---|
| | Dithio-diglycol | p-Formaldehyde | Ethylene Chlorohydrin | p-Toluene-Sulfonic Acid | Phosphoric Acid | |
| 16 | 1.0 | 1.2 | 0.1 | 12.0 g | — | 74-88 |
| 17 | 1.0 | 1.2 | 0.05 | 12.0 g | — | 73-86 |
| 18(1) | 1.0 | 1.2 | 0.2 | 12.0 g | — | 73-82 |
| 19 | 15.0 | 19.6 | 3.0 | 60.0 g | 135 ml | 75-86 |

| Ex. | MILS H$_2$O Collected | % Yield | Acid No. | % OH | % Cl | % S | Viscosity Poises |
|---|---|---|---|---|---|---|---|
| 16 | 25.5 | 97 | 1.75 | 0.70 | 2.34 | — | 131 |
| 17 | 25.5 | 97 | 1.76 | 0.57 | 1.30 | — | 319 |
| 18 | 28.0 | 96 | 2.69 | 0.59 | 3.64 | — | 66 |
| 19 | 450.5 | 95 | 1.30 | 0.64 | 4.08 | 34.3 | 38 |

Theoretical % S 35.0, depending upon the molecular weight of the polymer actually formed.
(1)Cyclohexane used as solvent-benzene used in all other experiments.

EXAMPLE 20

This example uses the ratio of dithiodiglycol to formaldehyde of 1 mol to 0.36 mols and produces a chlorine-terminated polysulfide polymer, in direct contradiction of U.S. Pat. No. 2,728,748 wherein the above ratio was stated to produce only —OH terminals. This example produced a polysulfide polymer, albeit with a different backbone structure than in said patent, having only 0.47% —OH and 3.85% chlorine, a result which is totally opposite to that which would be expected based upon the aforementioned prior art.

The actual procedure of this example was as follows. 1.0 mole (154 grams) of dithiodiglycol, 100 grams of benzene and 0.063 moles (12.0 g) of p-toluene sulfonic acid were charged to the reactor and heated to reflux. The reactor was equipped with a Barrett trap to remove the water. After 7½ hours of refluxing, pot temperature 81-92° C., 9.0 ml. of water had been collected and another 3.0 g. of p-toluene sulfonic acid was added. The dehydration was continued for a total of 22 ½ hours at a pot temperature of 81-85° C., and a total of 16.0 ml. of water was removed which represents about 80% completion. At this point, 0.36 moles (11.4 g.) of p-formaldehyde (95%) and 0.2 moles (16.1 g.) of ethylene chlorohydrin were added and refluxing continued for another 7 ¼ hours at a pot temperature of 85-92° C. 8.5 ml. of water was collected during this step making a total of 24.5 ml. The batch was then filtered using a Buchner funnel and vacuum (26 15 mm Hg.). 8.3 grams of catalyst were collected (not completely dry). The batch was then neutralized with NH$_3$ and again filtered. Another 4.5 grams of solids were collected. The benzene was removed in a rotovac at 85° C. and 5 mm Hg. 160.3 grams of product were obtained. A small portion of the final product was filtered again for chemical analyses. The chemical analyses are as follows: %S= 39.07; %OH — 0.47; %Cl — 3.85. Viscosity at 25° C. = 176 poise.

EXAMPLE 21

This example repeated the basic concept of Example 20, the contradictory result of producing chlorine terminals on a polysulfide polymer when the ratio of dithiodiglycol to formaldehyde is greater than 1, except with the difference that this time all of the p-formaldehyde was charged at the start of the reaction with the dithiodiglycol thereby producing a polymer with a slightly different backbone than in the previous example and in the prior art cited above. The experiment was as follows.

The reactor was charged with 1.0 mole (154.0 g.) of dithiodiglycol, 0.36 moles (11.4 g.) of 95% p-formaldyde, 0.079 mols (15.0 g.) of p-toluene sulfonic acid and 100.0 grams of reagent grade benzene. The reaction was heated to reflux with the water being collected in a Barrett trap. The batch was refluxed 13 ¾ hours at a pot temperature of 77-91° C. while 15.0 mls. of water were collected. At this point, another 3.0 g. of p-toluene sulfonic acid were added and refluxing continued. The refluxing was continued for a total of 73 ¾ hours at a pot temperature of 77-93° C. at which point a total of 22.0 mls. of water had been removed. The batch was filtered and 12.4 g. of catalyst, wet with product, were recovered. The batch was then neutralized with NH$_3$ and refiltered. Another 5.4 grams of solids (wet) were collected. The benzene was removed on a Rotovac at 10 mm Hg. vacuum and 85° C. The dry weight of the product before filtering was 163.0 grams. The chemical analyses were: % OH — 0.0; % Cl = 3.76; % S = 38.29. Viscosity 25° C. = 67 poise.

EXAMPLE 22

As indicated previously, instead of using a monohalogenated organic compound to convert the —OH terminals to halogen terminals, a hydroxyl group displacement reaction may be performed. This example shows the procedure to perform this reaction using trithiodiglycol in place of the dithiodiglycol used previously.

A mixture of 744 grams of trithiodiglycol, 140 g. 95% p-formaldehyde, 150 ml. benzene, and 12 g. p-toluene sulfonic acid monohydrate is refluxed to remove water of reaction until 70 mls. of water is collected by refluxing into a Barrett trap. After cooling, the product is filtered free of undissolved catalyst, and made slightly alkaline with gaseous ammonia. It is then distilled free of benzene. The product has a molecular weight of about 2000 and analyses as 1.7% OH content.

The liquid trithiodiglycol polyformal polymer so produced is then treated with thionyl chloride, $SOCl_2$, to replace the OH groups with Cl groups as follows: 600 g. of the trithiodiglycol polyformal are diluted with 200 grams benzene and 100 grams pyridine. The solution is heated to 80° C. with stirring. To it is added 40 g. thionyl chloride gradually over 60 minutes. The reaction mixture is kept as 80–85° C. during this period and for an additional 2 hours. The reaction mixture is cooled and washed twice by shaking with 500 mls. of water in a separatory funnel. The product, still dissolved in benzene, is separated and heated in a distillation equipment to remove the benzene, applying gradually increasing vacuum and temperture up to a product temperature of 100° C. to 10 mm Hg. absolute pressure. The product is a chlorine terminated polythiodiglycol-formaldehyde copolymer.

EXAMPLES 23–26

The procedure of Example 22 is used with other halogen-containing materials to displace the —OH terminals, as follows:

| Example No. | Halogen-Containing Material |
|---|---|
| 23 | $PCl_3$ |
| 24 | $PO_2Cl_3$ |
| 25 | $SOBr_2$ |
| 26 | $PF_5$ |

EXAMPLE 27

This example shows the preparation of a low molecular weight polysulfide copolymer using vacuum distillation to remove the water of reaction instead of the solvent method.

13 moles of dithiodiglycol (2015.2 grams), 14.3 moles of paraformaldehyde (451.6 grams) and 13 grams of p-toluene sulfonic acid were charged to a 3 liter flask and heat and vacuum applied. A slight $N_2$ sparge was used to prevent bumping. The water of reaction was pulled off under vacuum through a 6 inch Vigreaux column on the reactor, then through a cold water condenser to the receiver, a 500 ml. graduated cylinder. The vacuum, supplied by a water aspirator, was attached to a cold finger type condenser filled with crushed ice, also on the receiver. Over a 1 ½ hour period, the pot temperature was allowed to climb from 75° C. to 90° C., and the vacuum increased from 150 mm Hg. to 42 mm Hg. The vapor temperature dropped from 59° C. to 37° C. and 260 mls. of water were collected. At this point the vacuum was turned off and another 1.3 moles (41 grams) of paraformaldehyde, 13.0 grams of p-toluene sulfonic acid and 2.6 moles (209.4 grams) of ethylene chlorohydrin were added and reaction continued. During the next 2 hours, the pot temperature was adjusted to 110° C., vapor temperature 28° C., and vacuum 42 mm Hg., another 95 mls. of water were collected. At this point, sampling was started. After a total of 17 ½ hours, 362 mls. of water were collected. A final sample taken at this point (pot temp. 110° C., vapor temp. 24° C., vacuum 42 mm Hg.) had an acid of 1.64, 0.45% OH, 3.11% Cl and 34.96% sulfur.

EXAMPLES 28–32

The procedure of Example 27 is repeated using variations in the polythiodiglycol, the catalyst, the reaction temperature, and the use of formaldehyde in accord with Table IV below. Furthermore, halogen termination is provided by epibromohydrin for Example 28, $ClCH_2CH_2OCH_2CH_2OH$ for Example 29, $PCl_3$ for Example 30, $SOI_2$ for Example 31, and ethylene fluorohydrin for Example 32 all in accord with the procedures as shown in the previous Examples were solvents were used to remove the water of reaction. No solvent is used in these Examples.

TABLE IV
SUMMARY OF EXAMPLES 28–32

| | 28 | 29 | 30 | 31 | 32 |
|---|---|---|---|---|---|
| Polythiodiglycol (moles) | | | | | |
| Dithiodiglycol | 1.0 | 1.0 | — | — | 1.0 |
| Trithiodiglycol | — | — | 1.0 | — | — |
| Tetrathiodiglycol | — | — | — | 1.0 | — |
| Formaldehyde (moles) | — | 2.0 | — | .5 | — |
| Catalyst (amount) | | | | | |
| Sulfuric acid | 20 g. | — | — | — | — |
| Phosphoric acid | — | 50 ml. | — | — | 40 ml. |
| Sulfarnic acid | — | — | 18 g. | — | — |
| Ferric chloride | — | — | — | 10 g. | — |
| Reaction temperature, ° C. | 100 | 85 | 110 | 125 | 110 |

What is claimed is:
1. A process for preparing halogen terminated polysulfide polymers which consists of
   (a) polymerizing a polythiodiglycol in the presence of an acid catalyst, with means for removing the water of reaction, and at a temperature of about 60 to 140° C.; and
   (b) converting the resultant hydroxy-terminals on the poly(polythiodiglycol) to halogen terminals by reaction with an ethylene halohydrin.
2. A process as defined in claim 1 wherein the ethylene haloghydrin is ethylene chlorohydrin.
3. A process as defined in claim 1 wherein the conversion to halogen terminals occurs after the polymerization reaction has been completed.
4. A process as defined in claim 3 wherein the ethylene halohydrin is ethylene chlorohydrin.
5. A process as defined in claim 1 wherein the conversion to halogen terminals occurs during the polymerization reaction.
6. A process as defined in claim 5 wherein the ethylene halohydrin is ethylene chlorohydrin.
7. A process for preparing halogen terminated polysulfide polymers which consists of:
   (a) copolymerizing a polythiodiglycol and formaldehyde in the presence of an acid catalyst, with means for removing the water of reaction, and at a temperature of about 60° to 140° C; and
   (b) converting the resultant hydroxyl-terminals on the poly(polythiodiglycol-formaldehyde) copolymer to halogen terminals by reaction with an ethylene halohydrin.
8. A process as defined in claim 7 wherein the ethylene halohydrin is ethylene chlorohydrin.
9. A process as defined in claim 8 wherein the conversion to halogen terminals occurs during the polymerization reaction.

10. A process as defined in claim 9 wherein the ethylene halohydrin is ethylene chlorohydrin.

11. A process as defined in claim 7 wherein the conversion to halogen terminals occurs after the polymerization reaction has been completed.

12. A process as defined in claim 11 wherein the ethylene halohydrin is ethylene chlorohydrin.

13. In a method for preparing a polysulfide polymer having a backbone of substantially the general formula $$+CH_2CH_2OCH_2OCH_2CH_2S_x+_n$$

where $n$ is in the range of 2,000 to 4,000 and $x$ is an integer from 2 to 5, wherein a chlorine terminated component is reacted with a compound of the formula $Na_2S_x$ where $x$ is an integer from 2 to 5, the improvement which comprises using as the chlorine terminated component, the product obtained by polymerizing a polythiodiglycol in the presence of formaldehyde at a temperature of 60 to 140° C. in the presence of a Lewis acid catalyst and replacing terminal hydroxyl groups with an ethylene halohydrin.

14. A process as defined in claim 13 wherein the ethylene halohydrin is ethylene chlorohydrin.

15. In a method for preparing a polysulfide polymer having a backbone of substantially the formula $$+CH_2CH_2OCH_2CH_2S_x+_n$$

where $n$ is in the range of 2,000 to 4,000 and $x$ is an integer from 2 to 5, wherein a chlorine terminated component is reacted with $Na_2S_x$, wherein $x$ is an integer of from 2 to 5, the improvement which comprises using as the chlorine terminated component the product obtained by polymerizing a polythiodiglycol at a temperature of 60° to 140° C. in the presence of a Lewis acid catalyst and replacing terminal hydroxyl groups with an ethylene halohydrin.

16. A process as defined in claim 15 wherein the ethylene halohydrin is ethylene chlorohydrin.

* * * * *

UNITED STATES PATENT OFFICE
CERTIFICATE OF CORRECTION

Patent No. 4,124,645          Dated November 7, 1978

Inventor(s) Eugene R. Bertozzi

It is certified that error appears in the above-identified patent and that said Letters Patent are hereby corrected as shown below:

Column 10, Claim 9, in line 66 delete "8" insert therefor -- 7 --.

Signed and Sealed this

Twenty-ninth Day of May 1979

[SEAL]

Attest:

RUTH C. MASON
*Attesting Officer*

DONALD W. BANNER
*Commissioner of Patents and Trademarks*